F. R. PEELER.
MEAT TENDERER.
APPLICATION FILED OCT. 23, 1919.
1,326,780. Patented Dec. 30, 1919.
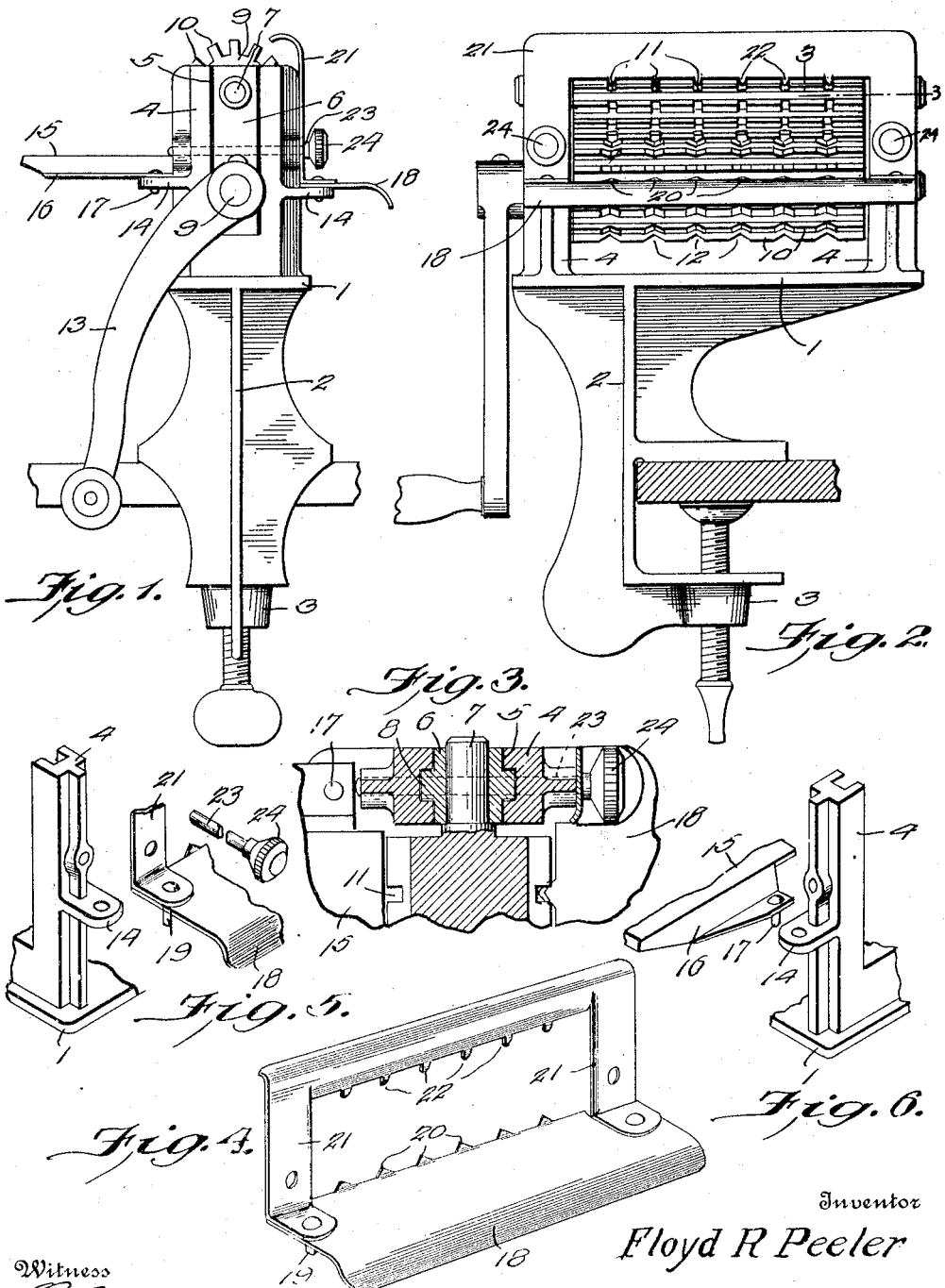

UNITED STATES PATENT OFFICE.

FLOYD R. PEELER, OF AKRON, OHIO.

MEAT-TENDERER.

1,326,780.  Specification of Letters Patent.  Patented Dec. 30, 1919.

Application filed October 23, 1919. Serial No. 332,788.

*To all whom it may concern:*

Be it known that I, FLOYD R. PEELER, a citizen of the United States, residing at Akron, in the county of Summit, State of Ohio, have invented a new and useful Meat-Tenderer; and I do hereby declare the following to be a full, clear, and exact description of the invention, such as will enable others skilled in the art to which it appertains to make and use the same.

The present invention relates to certain new and useful improvements in meat tenderers, and has for its object to provide a device of this character which is an improvement upon the construction shown in Patent No. 1,212,999 which was granted to me on January 16, 1917, and which embodies novel features of construction whereby it can be quickly taken apart and assembled, thereby enabling it to be thoroughly cleansed and kept in a sanitary condition without difficulty.

Further objects of the invention are to provide a device of this character which is comparatively simple and inexpensive in its construction, which can be easily manipulated, and which will cut and tear the meat in a most effective manner as it is passed through the same.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is an end view of a meat tenderer constructed in accordance with the invention.

Fig. 2 is a side elevation thereof, looking at the discharge end of the meat tenderer.

Fig. 3 is an enlarged horizontal sectional view through one end of the meat tenderer on the line 3—3 of Fig. 2.

Fig. 4 is a detached perspective view of the plate which receives the meat from between the rollers.

Fig. 5 is a detail perspective view showing the manner of detachably connecting the receiving plate to the main frame, the parts being separated.

Fig. 6 is a similar view showing the manner of detachably connecting the feed shelf to the main frame.

Corresponding and like parts are referred to in the following description and indicated in all the views of the drawings by the same reference characters.

Referring to the drawings, which illustrate one possible embodiment of the invention, the numeral 1 designates a base which is connected by a depending standard 2 to a conventional clamp 3 by means of which it can be readily mounted in position upon the edge of a table or some similar support. Standards 4 project upwardly from opposite ends of the base 1 and are bifurcated or slotted at 5 to receive corresponding slides 6. These slides are provided with bearings to receive the shafts 7, and the edges of the slides are formed with longitudinally extending ribs 8 which slidably interengage with corresponding grooves in the side walls of the slots 5. The slides 6 are thus removably mounted upon the standards, and the shafts can be disengaged from the slides when the latter are withdrawn from the standards.

The two shafts 7 are provided with rollers 9 and the peripheries of these rollers are formed with longitudinally extending intermeshing ribs 10. The ribs of the upper roller are shown as formed with rectangular notches 11, while the ribs of the lower roller are formed with the V-shaped notches 12, and these notches may be constructed in the manner set forth in my prior Patent No. 1,212,999 of January 16, 1917. The lower shaft 7 is shown as extended at one side and having a crank handle 13 applied thereto.

The standards 4 are provided upon opposite sides thereof with corresponding outstanding lugs 14 which project laterally and are provided with openings. A feeding shelf 15 is provided upon one side of the meat tenderer and provides a support for the meat as it is directed between the rolls. This feeding shelf is detachably secured to the main frame, being shown in the present instance as provided at opposite ends thereof with downwardly offset flanges 16 which are provided with pins 17, said pins being adapted to enter the openings of one set of the outstanding lugs 14. The inner edge of the shelf extends inwardly close to the rollers of the meat tenderer so that the meat will be directed between the rollers in a most effective manner as the rollers are turned by manipulating the crank handle.

A receiving shelf 18 is provided at the opposite side of the meat tenderer, said shelf being provided at the ends thereof with pins 19 which enter and interlock with the openings of the other set of outstanding lugs 14. The inner edge of the receiving shelf 18 is provided with teeth 20 which are pointed and shaped in a manner corresponding to that of the V-shaped notches 12 in the ribs 10 of the lower roller 9. These teeth project into the path of the said notched portions of the ribs and are deflected upwardly so that they have a tendency to disengage the meat from the notches and deflect it outwardly upon the receiving shelf. This receiving shelf 18 is provided with an arched frame 21 of which the upright portions fit against the standards 2, while the horizontal portion is formed with depending teeth 22 which project into the paths of the notches 11 in the ribs 10 of the upper roller 9. The upright portions of the arched frame 21 are perforated to receive transverse pins 23 which are removably inserted in corresponding openings formed in the standards 4 and slides 6. These pins are provided with the heads or finger pieces 24 so that they can be readily inserted in position or removed therefrom, and when the pins are in position they serve both to lock the slides 6 within the slotted standards and also to lock the receiving shelf 18 in position, since these transverse pins 23 are positioned at right angles to the before mentioned pins or studs 19 and the latter can not be disengaged from the openings in the outstanding lugs 14 until after the pins 23 have been withdrawn.

When the various parts have all been assembled as described, a piece of meat such as a cut of a steak can be easily and quickly prepared for cooking by placing it upon the feeding shelf 15 and permitting it to be carried between the rollers as the latter are rotated. After passing between the rollers the steak will move over the receiving shelf 18 and can be gathered upon a platter or any like dish. The construction of the rollers is such that the meat will be cut and torn in the desired manner, and the necessity of chopping the meat in the usual manner is entirely avoided. Not only is there a saving in time and labor, but the objectionable noise which is incident to the chopping of a piece of meat is eliminated. After the meat tenderer has been used it can be easily taken apart and disassembled by first removing the pins 23, thereby enabling all of the parts to be easily cleaned and facilitating the keeping of the device in a thoroughly sanitary condition.

Having thus described the invention, what I claim as new and desire to secure by Letters Patent, is:—

1. A meat tenderer including a frame formed with upright standards, a pair of rollers extending between the standards and formed with intermeshing projections, corresponding lateral lugs projecting in opposite directions from the standards and having perforations therein, a feeding shelf provided with pins adapted to detachably engage the perforations of one set of lateral lugs, and a receiving shelf provided with pins adapted to receive the perforations of the other set of lugs.

2. A meat tenderer including a frame formed with slotted standards, slides fitted removably in the standards, a pair of rollers journaled between the slides and provided with intermeshing projections, a shelf connecting the standards on one side of the rollers, removable pins inserted through the standards and slides to lock the slides in position, and means carried by the shelf for engaging the said pins.

3. A meat tenderer including a frame formed with slotted standards, slides fitted removably in the standards, rollers journaled between the slides and formed with intermeshing projections, lateral lugs projecting from the standards, a shelf connecting the standards on one side of the rollers and provided with means for detachably engaging the lateral lugs, removable pins inserted through the standards and slides to lock the slides in position, and means upon the shelf for engaging the said removable pins.

4. A meat tenderer including a frame formed with slotted standards, slides fitted removably in the standards, rollers journaled between the slides and formed with intermeshing projections, lateral lugs projecting from the standards, a shelf resting upon the lateral lugs and having a detachable pin connection therewith, an arched frame carried by the shelf, and removable pins inserted through the standards and slides to lock the slides in position, said removable pins also engaging the upright frame of the shelf to lock the shelf in position.

5. A meat tenderer including a frame formed with slotted standards, slides fitted removably in the standards, rollers journaled between the slides and formed with intermeshing projections, lateral lugs projecting from the standards, a shelf resting upon the lateral lugs and having a detachable pin connection therewith, an arched frame carried by the shelf, and removable pins inserted through the standards and slides to lock the slides in position, said removable pins also engaging the upright frame of the shelf to lock the shelf in position, the shelf and cross bar of the arched frame being provided with teeth which extend into the spaces between the projections of the rollers.

In testimony whereof I have signed my name to this specification in the presence of two subscribing witnesses.

FLOYD R. PEELER.

Witnesses:
  ROSCOE MURRAY,
  S. S. KEPLER.